(12) United States Patent
Heitmann et al.

(10) Patent No.: US 11,185,013 B2
(45) Date of Patent: Nov. 30, 2021

(54) SELF-PROPELLED FORAGE HARVESTER WITH AUTOMATIC CHOPPING SYSTEM

(71) Applicant: CLAAS Selbstfahrende Erntemaschinen GmbH, Harsewinkel (DE)

(72) Inventors: Christoph Heitmann, Warendorf (DE); Ingo Bönig, Gütersloh (DE); Carsten Grove, Beelen (DE); Alexander Kirchbeck, Drensteinfurt (DE); Bastian Kriebel, Münster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 411 days.

(21) Appl. No.: 16/285,469

(22) Filed: Feb. 26, 2019

(65) Prior Publication Data
US 2019/0261559 A1    Aug. 29, 2019

(30) Foreign Application Priority Data

Feb. 26, 2018    (DE) .......................... 102018104286.8

(51) Int. Cl.
*A01D 43/08*    (2006.01)
*A01D 41/02*    (2006.01)
(Continued)

(52) U.S. Cl.
CPC ........... *A01D 43/085* (2013.01); *A01D 41/02* (2013.01); *A01D 41/127* (2013.01);
(Continued)

(58) Field of Classification Search
CPC .... A01D 41/02; A01D 41/127; A01D 43/085; A01D 51/007; A01D 59/02; A01D 61/00
See application file for complete search history.

(56) References Cited

U.S. PATENT DOCUMENTS 9,707,972 B2 *   7/2017   Tuncer .................. B60W 10/30
9,934,538 B2 *   4/2018   Hunt ....................... H04L 67/12
(Continued)

FOREIGN PATENT DOCUMENTS

EP    1754407 A2    2/2007
EP    1847169 A1    10/2007
(Continued)

OTHER PUBLICATIONS

European Search Report for European Patent Application No. 18211604.6-1006 dated May 16, 2019.

*Primary Examiner* — Adam J Behrens
(74) *Attorney, Agent, or Firm* — Lempia Summerfield Katz LLC

(57) ABSTRACT

A self-propelled forage harvester is disclosed. The forage harvester includes a feed device, a chopping device comprising a cutterhead equipped with cutting blades and a shear bar for comminuting harvested material, a drive, and a driver assistance system for controlling at least the chopping device. The driver assistance system includes a memory for saving data and a computing device for processing the data saved in the memory, wherein the chopping device and the driver assistance system in combination form an automatic chopping system in that the computing device continuously determines a compaction of the comminuted harvested material using harvested material parameters during a harvesting process in order to autonomously ascertain and specify a cutting length to be adapted for maintaining nearly constant compactability.

19 Claims, 7 Drawing Sheets

(51) Int. Cl.
*A01D 41/127* (2006.01)
*A01D 51/00* (2006.01)
*A01D 59/02* (2006.01)
*A01D 61/00* (2006.01)

(52) U.S. Cl.
CPC ............ *A01D 51/007* (2013.01); *A01D 59/02* (2013.01); *A01D 61/00* (2013.01)

(56) References Cited

U.S. PATENT DOCUMENTS

| | | | | |
|---|---|---|---|---|
| 10,126,929 | B2 * | 11/2018 | Baumgarten | B60K 35/00 |
| 10,318,138 | B2 * | 6/2019 | Scholer | A01D 41/1277 |
| 10,694,668 | B2 * | 6/2020 | Blank | A01D 41/127 |
| 2007/0213106 | A1 * | 9/2007 | Degen | A01D 43/085 |
| | | | | 460/1 |
| 2007/0266687 | A1 * | 11/2007 | Diekhans | A01D 43/085 |
| | | | | 56/14.1 |
| 2009/0312920 | A1 * | 12/2009 | Boenig | A01D 43/085 |
| | | | | 701/50 |
| 2012/0004813 | A1 * | 1/2012 | Baumgarten | A01D 41/127 |
| | | | | 701/50 |
| 2012/0185140 | A1 | 7/2012 | Kormann et al. | |
| 2014/0019017 | A1 * | 1/2014 | Wilken | G05B 13/024 |
| | | | | 701/50 |
| 2014/0019018 | A1 * | 1/2014 | Baumgarten | A01D 41/127 |
| | | | | 701/50 |
| 2014/0129048 | A1 * | 5/2014 | Baumgarten | G06Q 10/04 |
| | | | | 701/1 |
| 2016/0029561 | A1 * | 2/2016 | Fischer | A01D 41/127 |
| | | | | 460/25 |
| 2016/0286720 | A1 * | 10/2016 | Heitmann | G05B 13/04 |
| 2016/0286721 | A1 * | 10/2016 | Heitmann | A01D 41/1272 |
| 2016/0286722 | A1 * | 10/2016 | Heitmann | A01F 12/18 |
| 2016/0309656 | A1 * | 10/2016 | Wilken | A01D 41/127 |
| 2017/0049045 | A1 * | 2/2017 | Wilken | A01D 41/06 |

FOREIGN PATENT DOCUMENTS

| | | |
|---|---|---|
| EP | 2361495 A1 | 8/2011 |
| EP | 2132974 B1 | 7/2012 |

* cited by examiner

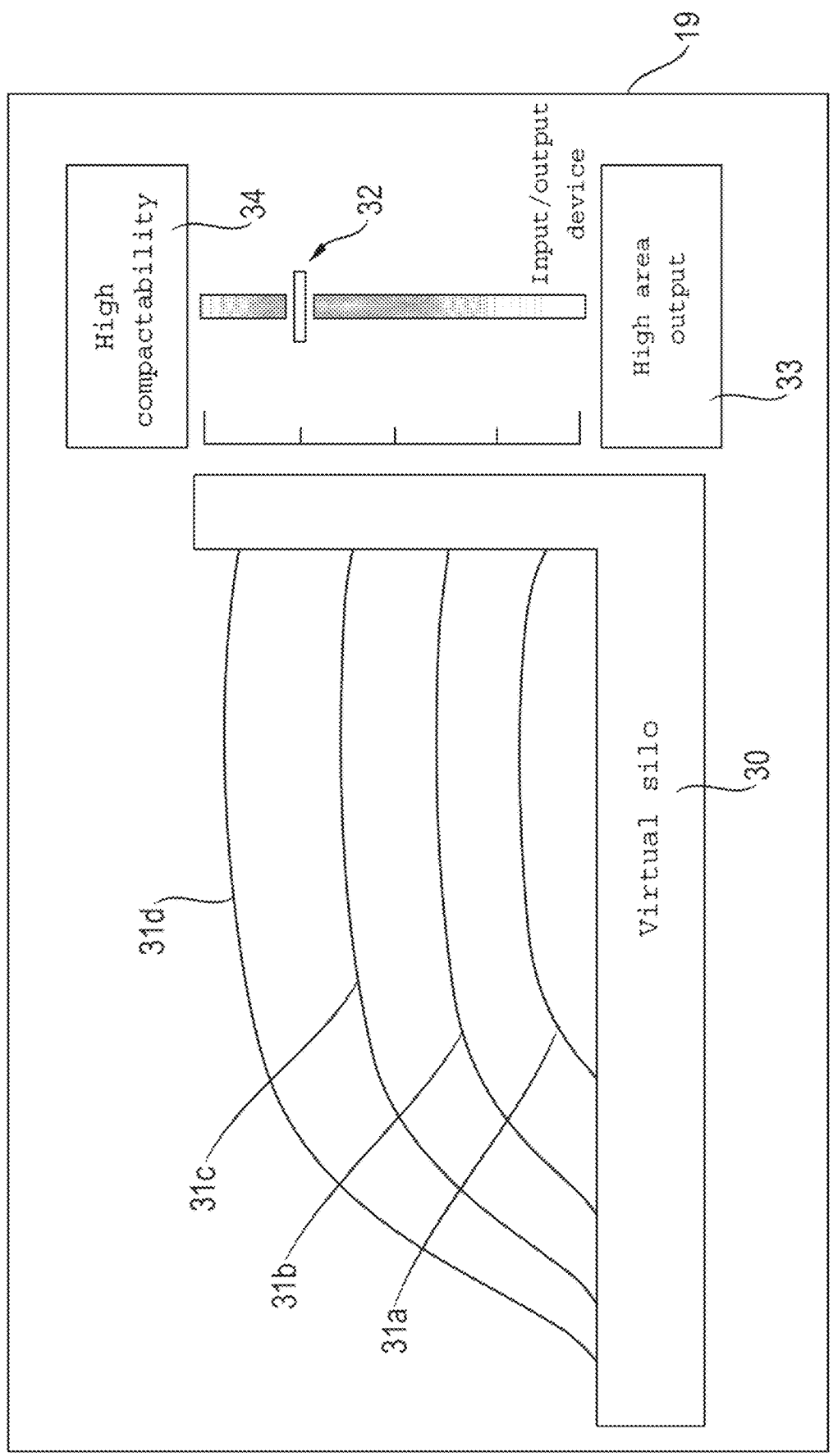

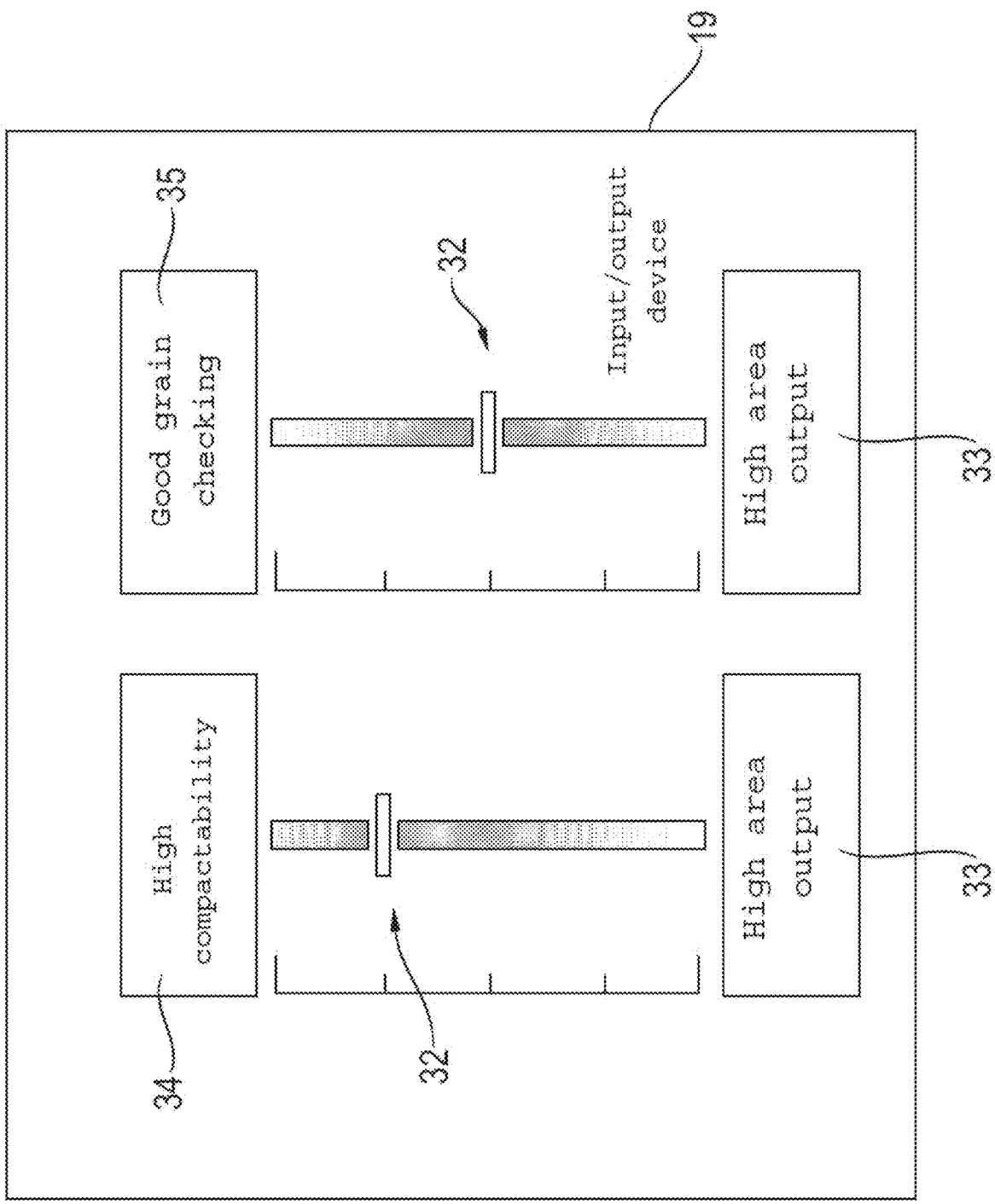

SELF-PROPELLED FORAGE HARVESTER WITH AUTOMATIC CHOPPING SYSTEM

CROSS REFERENCE TO RELATED APPLICATION

This application claims priority under 35 U.S.C. § 119 to German Patent Application No. DE 102018104286.8, filed Feb. 26, 2018, the entire disclosure of which is hereby incorporated herein by reference.

TECHNICAL FIELD

The technical field relates to an agricultural work machine. More specifically, the technical field relates to a self-propelled forage harvester.

BACKGROUND

Self-propelled forage harvesters serve to harvest and comminute harvested material that, inter alia, is used as feed or for biogas plants. For this, the comminuted or chopped harvested material is piled in silos and compacted by one or more compacting vehicles. Against the backdrop of low-loss feed preservation, particular importance is ascribed to compacting the harvested material in the silo since the storage density significantly determines the storage life of the silage in the open silo. The cutting length as well as the relative amount of dry matter in the processed fresh matter particularly influence the compactability of comminuted harvested material.

Whereas the relative dry matter represents a parameter of harvested material that cannot be influenced during the harvesting process, adjusting the cutting length, as an influencing variable, may be specified and adapted by the operator of the forage harvester before and during the harvesting process. Adjusting the cutting length substantially influences the compactability in the silo as well as the output per area that can be achieved by the forage harvester. Correspondingly, the operator's expertise may dictate whether the operating parameters selected by the operator for the respective harvesting process, inter alia adjusting the cutting length, lead to the desired harvesting goal of optimum compactability in the silo adapted to the harvested material parameters.

EP 2 132 974 B1 A (US Published Application No. 2009/0312920, incorporated by reference herein in its entirety) discloses a forage harvester with a control device that is configured to influence adjustable operating parameters of working units in the forage harvester. Using the control device, a forecast of the achievability of an actual harvesting goal at the end of the harvesting process chain is derived using harvested material parameters and operating parameters and a target criterion that corresponds to an envisioned compression of a comminuted harvested material in the silo. The forecast serves to inform the operator as to whether the desired harvesting goal is achievable based on the selected operating parameters. The forecast moreover serves to motivate the operator to make corrections to the operating parameters if necessary responsive to the forecast not corresponding to the desired harvesting goal.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein:

FIG. 6 shows a schematic visualization of a silo with different layer heights of comminuted harvested material on a screen of an input/output device of the driver assistance system.

FIG. 7 shows a menu interface of the input/output device with a plurality of harvesting process strategies.

DETAILED DESCRIPTION

Figure 1:
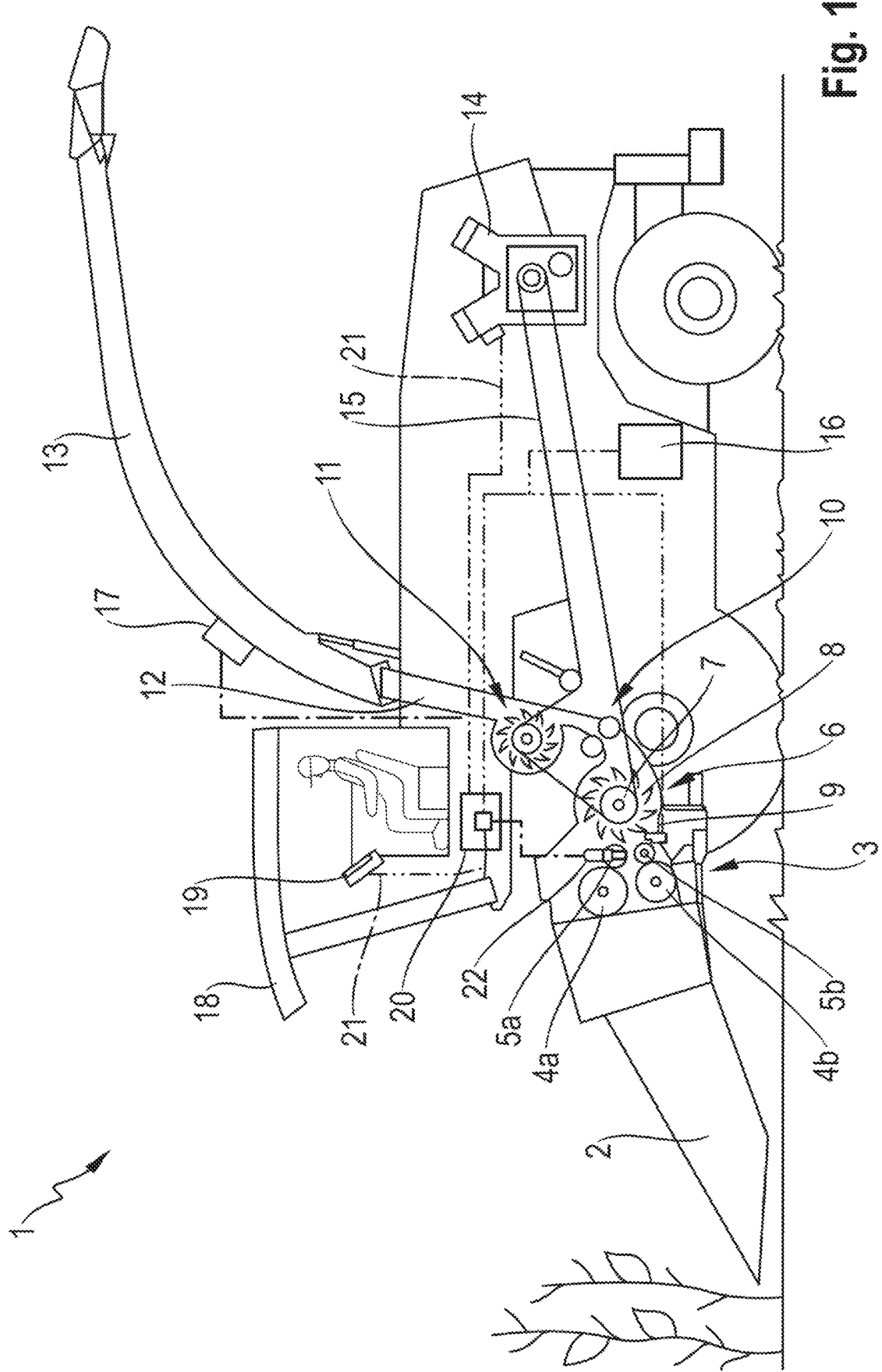
FIG. 1 shows a schematic representation of a forage harvester in a side view.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

In one implementation, a forage harvester is disclosed that enables comprehensive and advantageous control of the interaction between the feed device and chopping device with little effort and with little demands on an operator.

In one implementation, a self-propelled forage harvester is disclosed that includes: a feed device; a chopping device comprising a cutterhead equipped with cutting blades, and a shear bar for comminuting harvested material; a drive; and a driver assistance system for controlling at least the chopping device. The driver assistance system comprises a memory for saving data and a computing device for processing the data saved in the memory. For comprehensive and advantageous control of the interaction between the feed device and chopping device, the chopping device in combination with the driver assistance system form an automatic chopping system whereby the computing device of the driver assistance system is configured to determine (such as continuously determine) a compaction of the comminuted harvested material using harvested material parameters during a harvesting process in order to autonomously ascertain and specify a cutting length to be adapted in order to maintain nearly or substantially constant compactability. Thus, the driver assistance system, with its memory for saving data and its computing device, is configured to: autonomously determine and specify the required adjustments of operating parameters for the feed device and the chopping device so that the cutting length is adapted in order to maintain a predetermined compactability (e.g., a nearly constant compactability) of harvested material.

For this, the compaction may be assigned at least one characteristic map, wherein the compaction is defined as an output variable of the at least one characteristic map. The at least one characteristic map, saved in the memory of the driver assistance system, enables depiction of complex functional relationships with little computational effort. By using the at least one characteristic map, a predefined compactability (e.g., a nearly constant compactability) may be autonomously determined by the automatic chopping system for at least one harvested material parameter and the cutting length. A nearly constant compactability may be maintained using the at least one characteristic map by cyclically adapting the cutting length to a changing harvested material parameter.

In one implementation, the input variables for the at least one characteristic map may be any one or both of a "cutting length" parameter, and a "relative dry matter content" parameter. Using the at least one characteristic map, relative functional relationships of the working units of the forage harvester may be represented for the cutting length. It is contemplated for the at least one characteristic map to input other variables (in addition to or instead of the "cutting length" parameter and the "relative dry matter content" parameter) that may influence compaction, such as fluctuations in the gathered amount of harvested material.

In one implementation, the computing device may be configured to cyclically adjust the at least one characteristic map during an ongoing harvesting mode to a current harvesting process state. In one implementation, the term "cyclical" may be understood to be a continuous, timed execution of ascertaining the current harvesting process state, wherein the timing between executions may be variable or may be constant. To implement such an adjustment, it may be provided to remeasure several points within the characteristic map using sensors. In particular, a deviation of the measured points from the associated points of the currently established characteristic map may cause a corresponding adaptation of the at least one characteristic map.

According to one implementation, a target cutting length may be specified depending on a harvested material parameter using an input/output device. This development allows an operator to set a specified harvesting goal, for example by specifying the target cutting length depending on the relative dry material content. In addition, a relative or absolute deviation in the cutting length from the target cutting length may be set by the operator using the input/output device.

In one implementation, the cutting length may be adapted depending on a current layer height in a silo. As the layer height increases, the pressure on the bottom layers of harvested material increases due to the intrinsic weight of the harvested material, so that the bottom layers in the silo may have a longer cutting length than the top layers with an equivalent dry material content.

In order to implement the selected harvesting process strategy, a plurality of selectable harvesting process strategies may be saved in the memory, and the computing device may be configured to autonomously ascertain at least one operating parameter that influences the cutting length, such as any one, any combination, or all of: the feed speed of the feed device; the rotating speed of the chopping device; or the driving speed of the drive. Further, the computing device may specify at least one operating parameter to a respective working unit that corresponds to the operating parameter.

Moreover, a post-processing device, which may be operated according to a selectable harvesting process strategy, can be downstream from the chopping device. In one implementation, the post-processing device has a driven pair of rollers with a profiled surface that are arranged spaced from each other in the flow of material through the forage harvester. The spacing between the rollers and a difference in the rotational speed that exists between the rollers may be changed. According to this implementation, the cracking of corn grains is of primary consideration. The degree to which the grain is cracked determines the amount of energy available at a later time when used as feed or in a fermenter of a biogas plant. Moreover, the post-processing device helps defiber the harvested material. The latter influences the compactability of the harvested material in the silo. In addition to the difference in rotational speed of the rollers, the distance between the rollers is relevant in the degree to which the grains are cracked. In so doing, a reduction of the roller spacing may lead to increased power consumption of the post-processing device, e.g., to increased fuel consumption.

In one implementation, the selectable harvesting process strategies may each be directed to a target specification for adjusting or optimizing at least one harvesting process parameter, e.g., compactability, grain cracking, or area output or respectively fuel consumption, by correspondingly specifying the at least one operating parameter that influences the cutting length or the grain cracking. In so doing, the harvesting process parameters of compactability or grain cracking and area output may conflict with each other.

According to one implementation, a harvesting process strategy may be specified by another process participant participating in the harvesting process and transmitted to the computing device of the forage harvester. This enables a process participant, located at a difference place in the process chain (such as at the end of the process chain), to influence the harvesting process at the beginning of a process chain. The compaction of the harvested material in the silo may be performed by one or more compaction vehicles that are at the end of the process chain. The operator of a compaction vehicle knows the respective layer height. Accordingly, it may be warranted to have the harvesting process strategy specified and/or changed by the operator of the compaction vehicle. Accordingly, at the beginning of piling and compacting, a harvesting process strategy may be specified that enables a greater cutting length or higher area output while the compactability is nearly constant.

For this, the automatic chopping system may use a first characteristic of constant compactability that is determined by the driver assistance system by means of the characteristic map corresponding to specifiable boundary conditions of the harvested material parameters and target cutting length: the harvesting process strategy. As the layer height increases, it may be warranted to adapt the harvesting process strategy to achieve a nearly constant compaction within the silo. This may be initiated by the operator of the compaction vehicle in that a corresponding request is transmitted to the driver assistance system of the forage harvester. The operator of the forage harvester may be informed by an input/output device of the changed request (e.g., an updated harvesting process strategy that is different from a current harvest process strategy of the forage harvester). In one implementation, the changed request may be implemented responsive to approval by the operator of the forage harvester. Alternatively, the changed request may be implemented automatically, with the operator of the forage harvester being notified of the change via the input/output device. In this regard, the adaption may be based on input from two different areas, including one local and one remote.

Moreover, this request may necessitate an actuation by the operator of the forage harvester which is particularly recommended when a transport vehicle accompanying the forage harvester is only partially filled. Accordingly, the operator of the forage harvester may only acknowledge the request when the transport vehicle has changed. A fleet management system, enabling overarching communication of the process participants with each other (e.g., inter-device communication), makes it possible to inform the operator of the compaction vehicle of which the arriving transport vehicle is filled with harvested material that was processed by the forage harvester according to the changed harvesting process strategy. Correspondingly, the harvested material with greater compactability processed by the forage harvester may thus be added to the silo further to the top.

Referring to the figures, FIG. 1 shows a schematic representation of a forage harvester 1 in a side view. The forage harvester 1 has an attachment 2 for harvesting in particular harvested material with stalks. The harvested material gathered by the attachment 2 is supplied to a feed device 3. The feed device 3 comprises at least one first pair of rollers 4a, 4b and a second pair of rollers 5a, 5b that are arranged on a frame or a housing. The at least two roller pairs 4a, 4b and 5a, 5b serve to pull in and prepress the harvested material. A chopping device 6 is downstream from the feed device 3. The chopping device 6 comprises a rotatably driven cutterhead 7 equipped with cutting blades 8. To comminute the harvested material supplied in the form of a compacted harvested material mat, the cutting blades 8 that rotate with the cutterhead 7 interact with a fixedly arranged shear bar 9. The distance of the shear bar 9 relative to the envelope circle of the cutting blades 8 may be adjusted and readjusted. A very small distance contributes to a reduction in the force required for cutting and a constant cutting quality.

The comminuted harvested material leaving the chopping device 6 may be supplied to an optionally provided post-processing device 10. The post-processing device 10, which may also be termed a conditioning apparatus or corn cracker, serves to crack corn grains in order to increase the usability or energy yield when used as feed or in a biogas plant. Such post-processing devices 10 comprises a roller pair, wherein the rollers are driven at different rotational speeds. The rotational speed ratio of the roller pair of the post-processing device 10 is variable. The grain cracking may be determined by a gap width between the two rollers of the post-processing device 10. The smaller the gap width, the greater the grain cracking. The gap width is adjustable. The post-processing device 10 is removable from the flow path of material of the forage harvester 1 as needed.

From the chopping device 6 or the optional post-processing device 10, the comminuted harvested material passes to a post accelerator 11 that transfers the harvested material through a delivery shaft 12 and a subsequent discharge chute 13 to a transport vehicle (not shown) adjacent to the forage harvester 1. The transport vehicle transports the processed harvested material to a silo (not shown) in which it is compacted by one or more compacting vehicles. Arranged on the discharge chute 13 is a sensor 17 that is configured to at least determine the moisture content of the comminuted harvested material, or respectively the dry matter. The sensor 17 may be designed as an near infrared (NIR) sensor that is also configured to detect contents, such as the raw ash or raw protein content of the harvested material flowing by.

To drive the forage harvester 1, a drive device 14 designed as an internal combustion engine is included that drives any one, any combination, or all of the chopping device 6, the post-processing device 10 and the post accelerator 11 by means of a belt drive 15. The attachment 2 as well as the feed device 3 may be driven by another drivetrain that is mechanically coupled to the chopping device 6, or may be operated hydrostatically independently of the chopping device 6. Moreover, a hydrostatic drive 16 may be included, through which the driving speed of the forage harvester 1 may be regulated.

The forage harvester 1 has a cabin 18 in which an input/output device 19 is provided that is available to an operator of the forage harvester 1. The input/output device 19 may, for example, enable adjusting and readjusting of operating parameters, and inform the operator of current operating or harvesting conditions. The input/output device 19 is connected by a bus system 21 to a driver assistance system 20 of the forage harvester 1 The bus system 21 moreover connects the sensor 17 on the discharge chute 13, as well as a sensor 22 of the feed device 3 and other sensors and actuators (not shown) for monitoring and adjusting the attachment 2, feed device 3, chopping device 6 and the drive 16 to the driver assistance system 20. These other sensors and actuators are known to one of skill in the art.

In order to ensure a specific cutting length or chaff length of the harvested material that can be specified by the input/output device 19, the advancing speed of each downstream working unit relative to the preceding one is increased along the path of the harvested material through the forage harvester 1. This means that the roller pairs 4a, 4b and 5a, 5b of the feed device 3 are driven at a lower peripheral speed than the cutterhead 7 of the chopping device 6. The change in the drive speed of the roller pairs 4a, 4b and 5a, 5b of the feed device 3 causes a slower or faster supply of the harvested material gathered by the attachment 2 to the chopping device 6, which correspondingly yields a shorter or longer cutting length.

Figure 2:
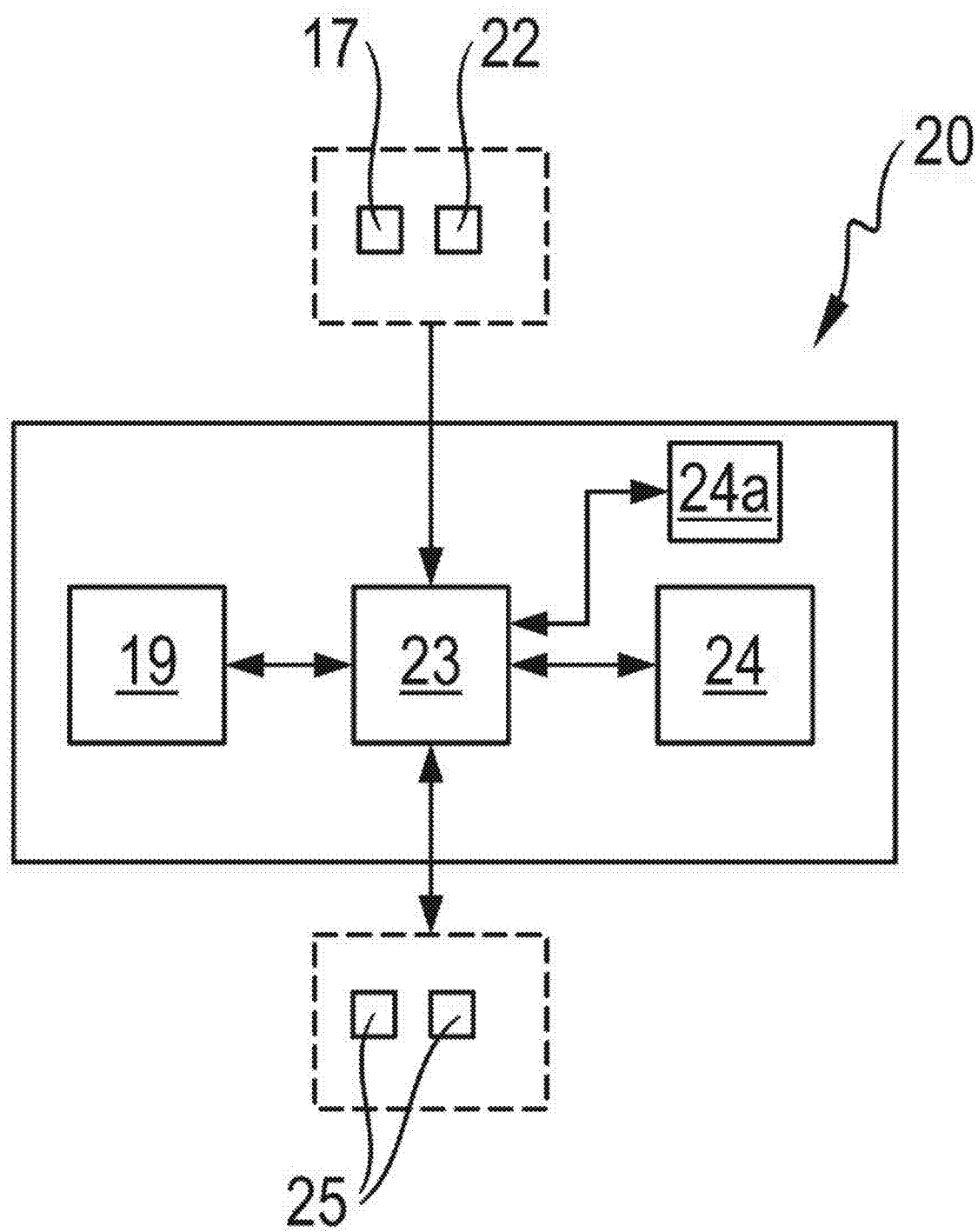
FIG. 2 shows a schematic representation of the design of a driver assistance system.

FIG. 2 schematically portrays the design of the driver assistance system 20. The driver assistance system comprises a computing device 23 and a memory 24 configured to save data, such as the measurement signals provided by the sensors 17 and 22. Computing device 23 processes the data saved in the memory 24. The computing device 23 is connected by the bus system 21 to actuators 25 of the forage harvester 1 in order to monitor and control actuators 25.

In one implementation, the chopping device 6 and the driver assistance system 20 form an automatic chopping system in that the computing device 23 is configured to continuously determine a compaction of the comminuted harvested material using harvested material parameters detected by sensors during a harvesting process in order to autonomously ascertain and specify a cutting length to be adapted in order to maintain nearly constant compactability. The automatic chopping system may coordinate one, some or all of the working units that interact to maintain a predetermined compactability (e.g., a nearly constant compactability) of the harvested material, e.g., the operating parameters one or both of the feed device 3 and the chopping device 6, without requiring external intervention by an operator. In so doing, the operator may specify a desired target cutting length through the input/output device 19 without having the required knowledge to achieve the target cutting length of which adjustments of the operating parameters are needed at least for the feed device 3 and the chopping device 6. Moreover, the automatic chopping system may also coordinate the operating parameters of the post-processing device 10 in a corresponding manner.

The compaction of the harvested material results from the relative dry material content and cutting length. As the dry material content increases, the cutting length is to be reduced in order to achieve the compactability in the silo. Along with the reduction of the cutting length, the area output decreases, and the fuel consumption simultaneously increases. In order to be able to ensure a nearly constant compactability of the comminuted harvested material in a silo over the duration of a harvesting process, at least one characteristic map 26 is saved in the memory 24 that is assigned to the compaction. In one implementation, the harvested material parameters of "cutting length" and "relative dry matter content" are the input variables for the at least one characteristic map, whereas the compaction that can be achieved depending thereupon, represented as the "dry matter density", is defined as the output variable of the at least one characteristic map 26.

Figure 3:
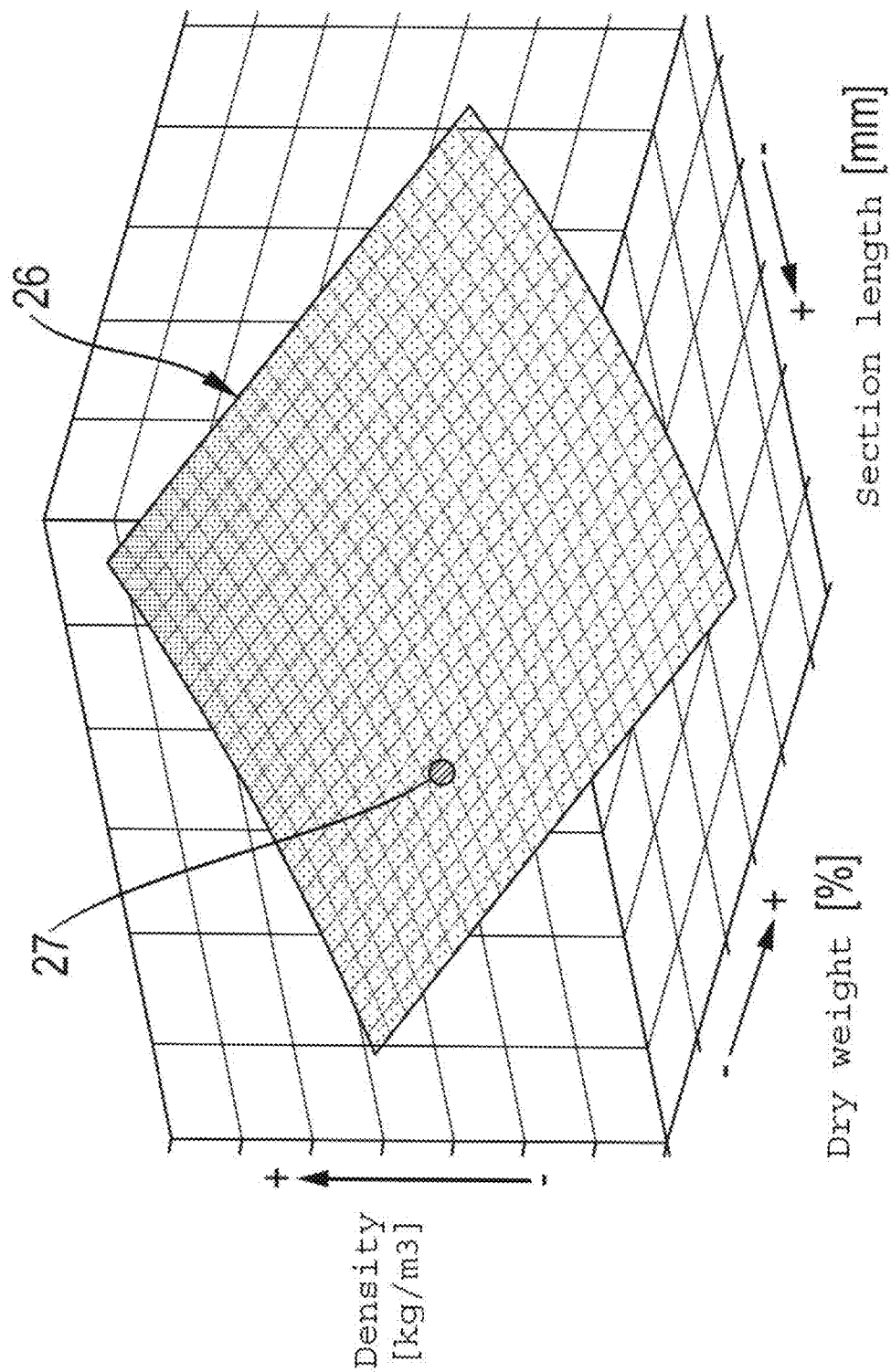
FIG. 3 shows a characteristic map saved in a memory of the driver assistance system.
Figure 4:
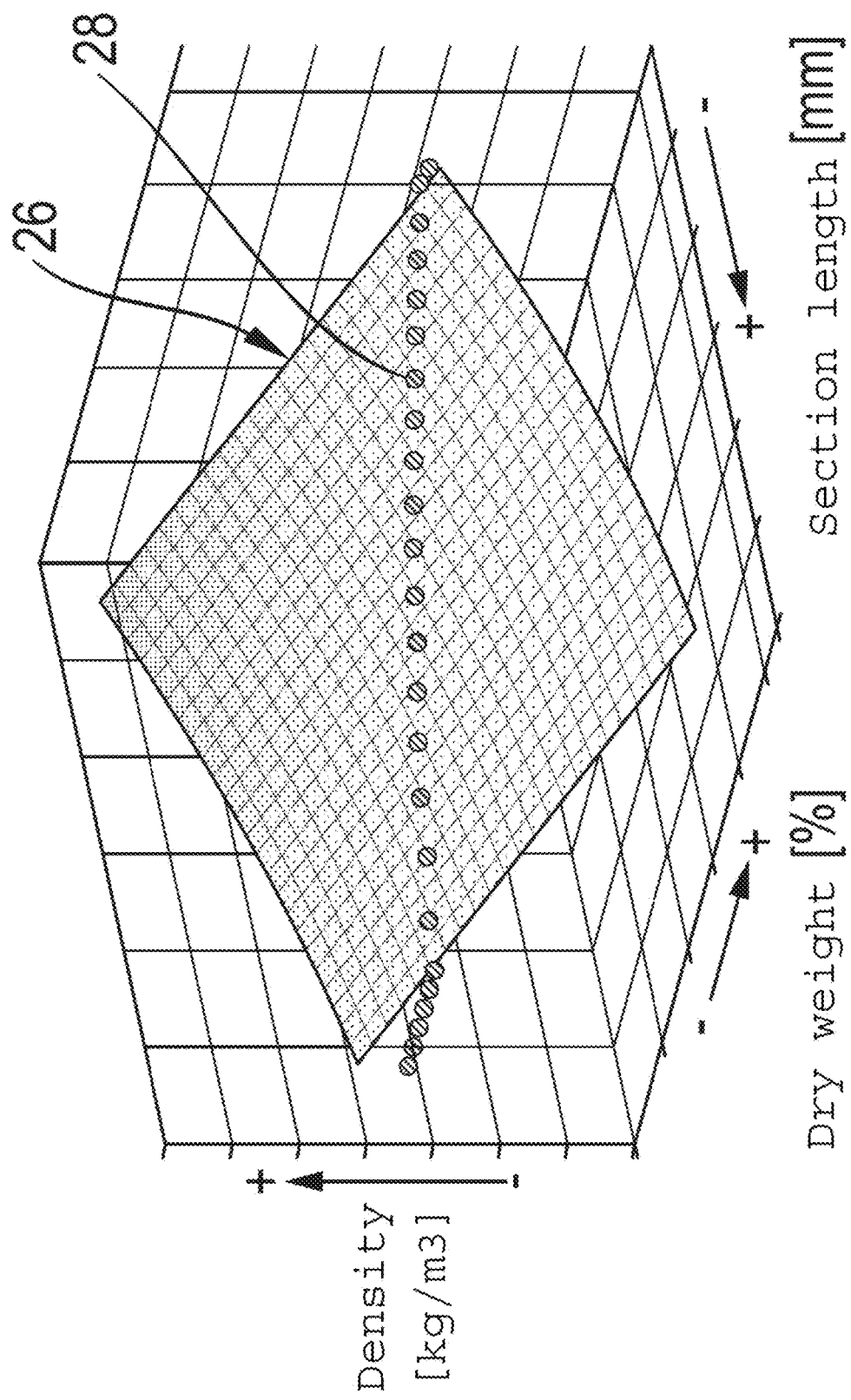
FIG. 4 shows the characteristic map according to FIG. 3 with a characteristic of constant compactability determined by the driver assistance system.

FIG. 3 shows a characteristic map 26 saved in the memory 24 with an operating point 27 of a compactability achievable based on the specified target values and determined by the driver assistance system 20 based on a user-side specification of the cutting length and dry matter content. FIG. 4 portrays the characteristic map 26 with a characteristic 28 of constant compactability determined by the driver assistance system 20. The portrayal of the characteristic map 26 in FIG. 4 shows the functional relationship between the output variable of "compaction" or "density of the fresh material" and the input variables of "relative dry matter content" and "cutting length". As can be seen from the path of the characteristic 28, a constant compactability can be realized given a low dry material content with a high cutting length. As the dry material content in the harvested material increases, the cutting length is reduced at which a constant compactability is achievable.

The at least one characteristic map 26 may be continuously adjusted to the current harvesting process by the computing device 23 in ongoing harvesting mode in order to determine deviations between the relationships depicted in the characteristic map 26 and the actual harvesting process state. In the case of a deviation, the at least one characteristic map 26 may be adjusted to the actual harvesting process state in a recursive method and saved in the memory 24.

In this manner, the influencing variables, which may influence the cutting length, may be accounted for in an ongoing harvesting process. In addition to fluctuations in the dry material content of the harvested material, changes in the density of harvested material may necessitate adapting the cutting length in order to achieve a nearly constant compactability in the silo. Further, significant changes to the density of harvested material may cause an increase or reduction of the harvested material gathered by the attachment 2. In particular, a reduction of the gathered amount of harvested material may cause the feed device to generate a harvested material mat of lower density. In order to compensate for these quantity fluctuations, the driving speed may be modified, which may be accomplished by correspondingly controlling the drive 16 (e.g., the driver assistance system 20 may control the drive in order to change the driving speed in order to compensate for the quality fluctuations).

A variation in the feed speed of the feed device 3 may cause a change in the cutting length during ongoing harvesting mode. In particular, as the feed speed of the feed device 3 increases while the rotational speed of the cutterhead 7 remains the same, the cutting length of the harvested material is increased. Correspondingly, the cutting length of the harvested material decreases as the feed speed drops while the rotational speed of the cutterhead 7 remains the same.

Another way to influence the cutting length is to vary the number of cutting blades 8 on the cutterhead 7. This may be performed before harvesting and may correspondingly be taken into account when regulating the cutting length.

Another influential factor is the piling of the comminuted harvested material in a silo. As the layer height increases, a high pressure is exerted on the bottom layers with comminuted harvested material by the intrinsic weight of the layers lying above. This makes it possible to select a longer cutting length at the beginning of piling the comminuted harvested material in the silo than at a later time. Thus, in addition to (or instead of) the relative dry material content, the cutting length may also be adapted depending on the layer height or stack height in the silo in order to obtain a nearly constant compactability. This additional parameter that reflects the respective layer or stack height may be transmitted, by a compacting vehicle that is moving in the silo, to the forage harvester 1 or the forage harvesters 1 that is/are working a field. In addition, it is contemplated to specify a target compactability that is adapted to the layer height in the silo. To accomplish this, the driver assistance system 20 has a communication interface 24a that is configured to receive a specification for the target compactability from a separate electronic device, such as mobile data processing unit, of another process participant such as the compacting vehicle in the silo.

Figure 5:
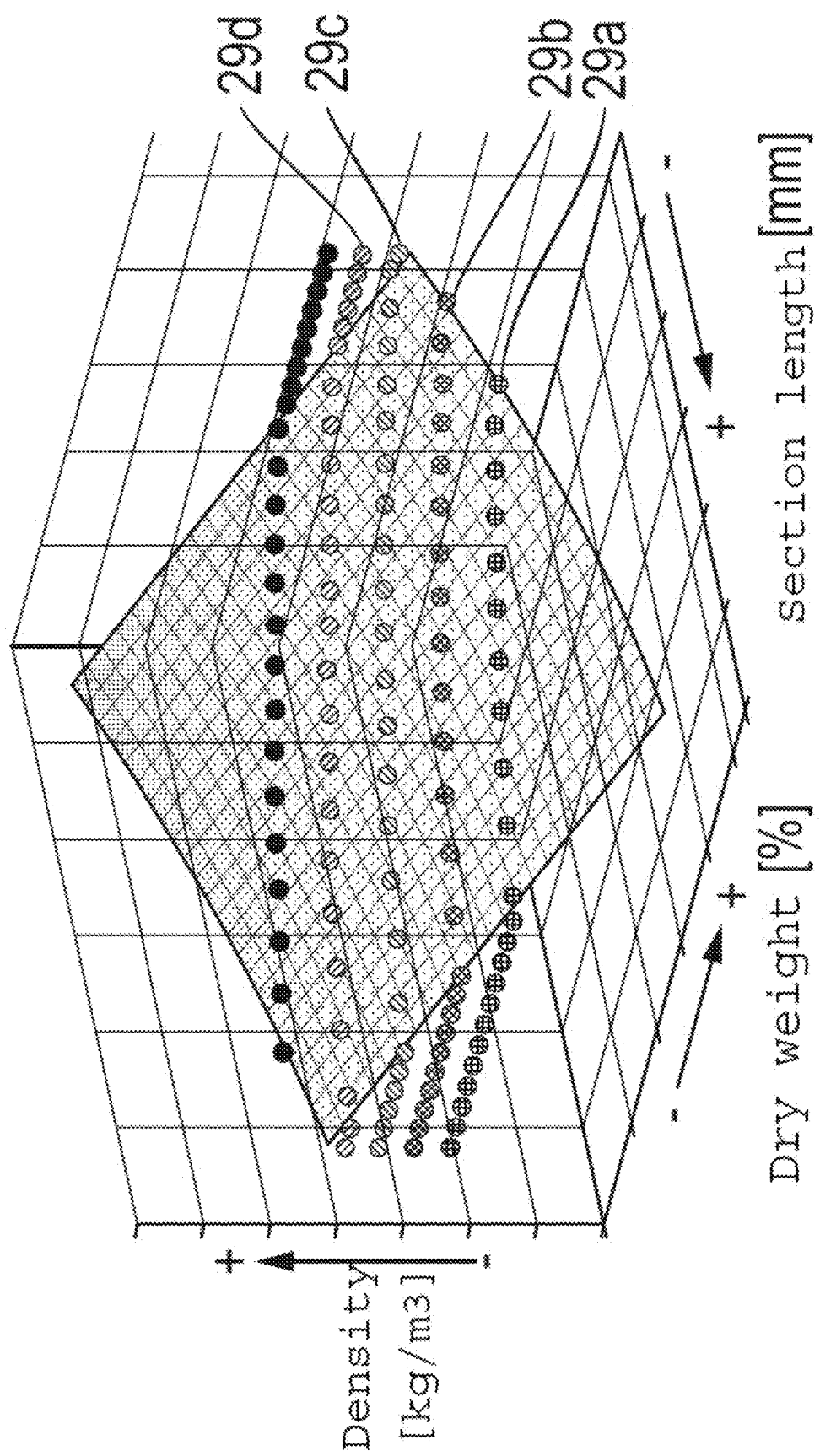
FIG. 5 shows the characteristic map according to FIG. 3 in which a plurality of characteristics of constant compactability are sketched.

FIG. 5 depicts the characteristic map of compaction according to FIG. 3 in which a plurality of characteristics 29a, 29b, 29c, 29d of constant compactability are sketched as examples. The characteristics 29a, 29b, 29c, 29d are determined as previously described. The respective characteristic 29a, 29b, 29c, 29d of constant compactability is selected depending on a strategic specification by the operator of the forage harvester 1 and/or the compacting vehicle in the silo.

The depiction in FIG. 6 schematically illustrates a visualization of the silo 30 with different layer heights 31a, 31b, 31c, 31d of comminuted harvested material on a screen of the input/output device 19. This visualization may analogously be on a mobile data processing device such as a smart phone or tablet by means of a suitable application, such as an app. Moreover, the depiction in FIG. 6 shows an operating element designed as a virtual slider 32 that may be adjusted between two opposing strategic specifications, "High area output" 33 and "High compactability" 34 of a respective harvesting processing strategy. The positioning of the virtual slider 32 between the two strategic specifications 33, 34 yields a different weighting in achieving the respective strategic specifications 33, 34. Accordingly, a harvesting process strategy to achieve a high area output may be prioritized more strongly which is associated with the automatic chopping system adjusting a long cutting length. If the slider 32 is shifted toward "High compactability" 34, this causes a shorter cutting length to be set. Accordingly, a harvesting process strategy may be prioritized more strongly to achieve a high compactability. In order to ensure the nearly constant compactability under the existing harvesting conditions, the characteristic that fulfills this requirement is selected autonomously by the driver assistance system 20 from the characteristics 29a, 29b, 29c, 29d of constant compactability.

With the aim of simplifying the processes in logistical planning, the strategic specification 33, 34 may be specified by the operator of the compacting vehicle and adapted over the course of the harvesting process. Accordingly, the operator of the compacting vehicle can first prioritize the specification "High area output" 33 since longer cutting lengths may be tolerated when there is a lower layer height 31a in a silo 30, even when the dry material content is higher. The cutting length is set in this case using one of the characteristics 29a, 29b, 29c, 29d of constant compactability that are saved in the memory 24 of the driver assistance system 20 and cyclically adapted. Over the course of piling, sufficiently good compaction nonetheless still occurs. As the layer height 31b, 31c increases, the operator of the compacting vehicle may change the weighting of the strategic specification from "High area output" 33 to "High compactability" 34 in order to achieve nearly constant compaction in the silo. This change information may be transmitted to the forage harvester 1. This change in the strategic specification 33, 34 may be confirmed by the operator of the forage harvester 1 so as to be actively implemented by the automatic chopping system. It is contrastingly also contemplated for the operator of the forage harvester 1 to only be informed about the change of the strategic specification 33, 34 when the automatic chopping system is active.

In the context of overarching communication, in particular by means of a fleet management system between the process participants, e.g., the at least one forage harvester 1, the transport vehicles operating back and forth between the field to be harvested and the silo, and the at least one compacting vehicle in the silo, the operator of the compacting vehicle is informed about which transport vehicle is delivering processed comminuted harvested material according to the respective strategic specification. The operator of the compacting vehicle is therefore made aware of the time at which comminuted harvested material with a higher compactability, e.g., shorter cutting length, is reaching the silo. This harvested material may be correspondingly piled further to the top, e.g., above a higher layer in the silo.

The depiction according to FIG. 7 shows a menu interface of the input/output device 19 with the visualization of a plurality of harvesting process strategies. In addition to the strategic specifications of "High area output" 33 and "High compactability" 34 of the first harvesting process strategy, another harvesting process strategy is depicted that comprises "High area output" 33 and "Good grain cracking" 35 as strategic specifications. An operating element designed as a virtual slider 32 is also provided between these two strategic specifications 33 and 35 and enables a change in the weighting between the two contrary strategic specifications of "High area output" 33 and "Good grain cracking" 35 when they are reached. The weighting influences the degree to which the strategic specifications 33, 34, 35 are achieved, wherein a shift in the weighting toward "High area output" 33 and/or "Good grain cracking" 35 is associated with a decrease in the achievable area output and an increasing fuel consumption. Accordingly, the power consumption of the post-processing device 10 increases when the weighting is shifted toward the strategic specification 34, which means a reduction in the spacing of the roller pair.

Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, computing device 23 is configured to process data saved in the memory 24. Computing device may comprise a microprocessor. Though computing device 23 and memory 24 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE NUMBERS

| | |
|---|---|
| 1 | Forage harvester |
| 2 | Attachment |
| 3 | Feed device |
| 4a | Roller |
| 4b | Roller |
| 5a | Roller |
| 5b | Roller |
| 6 | Chopping device |
| 7 | Cutterhead |
| 8 | Cutting blade |
| 9 | Shear bar |
| 10 | Post-processing device |
| 11 | Postaccelerator |
| 12 | Delivery shaft |
| 13 | Discharge chute |
| 14 | Drive device |
| 15 | Belt drive |
| 16 | Drive |
| 17 | Sensor |
| 18 | Cabin |
| 19 | Input/output device |
| 20 | Driver assistance system |
| 21 | Bus system |
| 22 | Sensor |
| 23 | Computer device |
| 24 | Memory |
| 25 | Actuator |
| 26 | Characteristic map |
| 27 | Operating point |
| 28 | Characteristic |
| 29a | Characteristic |
| 29b | Characteristic |
| 29c | Characteristic |
| 29d | Characteristic |
| 30 | Virtual silo |
| 31a | Layer height |
| 31b | Layer height |
| 31c | Layer height |
| 31d | Layer height |
| 32 | Virtual slider |
| 33 | Strategic specification |
| 34 | Strategic specification |
| 35 | Strategic specification |

The invention claimed is:

1. A self-propelled forage harvester comprising:
a feed device;
a chopping device comprising a cutterhead with cutting blades and a shear bar for comminuting harvested material;
a drive;
a driver assistance system comprising a memory for saving data including storing a plurality of selectable harvesting process strategies and a processor for processing the saved data, the driver assistance system configured to control at least the chopping device, and
wherein the chopping device in combination with the driver assistance system form an automatic chopping system in that the processor is configured to continuously determine a compaction of the comminuted harvested material, and based on at least one of the stored plurality of selectable harvesting process strategies, to autonomously ascertain at least one operating parameter that influences cutting length and to control, based on the ascertained at least one operating parameter, a respective working unit thereby adapting the cutting length in order to maintain a predetermined compactability.

2. The self-propelled forage harvester of claim 1, wherein the processor is configured to use at least one characteristic map; and
wherein the compaction is defined as an output variable of the at least one characteristic map.

3. The self-propelled forage harvester of claim 2, wherein input variables for the at least one characteristic map comprise a "cutting length" parameter and a "relative dry matter content" parameter.

4. The self-propelled forage harvester of claim 2, wherein the processor is configured to:
ascertain, based on at least one sensor, a current harvesting process state; and
cyclically adjust the at least one characteristic map during an ongoing harvesting mode to the current harvesting process state.

5. The self-propelled forage harvester of claim 1, further comprising an input/output device; and
wherein input/output device is configured to receive a target cutting length that is dependent on a harvested material parameter.

6. The self-propelled forage harvester of claim 5, wherein the input/output device is configured to receive from an operator a relative or absolute deviation in the target cutting length.

7. The self-propelled forage harvester of claim 1, wherein the processor is configured to:
receive, from at least one device, a current layer height in a silo; and
adapt the cutting length dependent on the current layer height in the silo.

8. The self-propelled forage harvester of claim 1, wherein the driver assistance system further comprises a communication interface that is configured to receive a specification for a target compactability from another process participant participating in a harvesting process.

9. The self-propelled forage harvester of claim 8, wherein the target compactability is specified depending on a current filled level in a silo.

10. The self-propelled forage harvester of claim 1, wherein the at least one operating parameter comprises feed speed of the feed device, rotating speed of the chopping device, or driving speed of the drive.

11. The self-propelled forage harvester of claim 1, further comprising a post-processing device downstream from the chopping device and configured to operate according to the at least one of the plurality of selectable harvesting process strategies.

12. The self-propelled forage harvester of claim 1, wherein the plurality of selectable harvesting process strategies are each aimed at a target specification for adjusting or optimizing at least one harvesting process parameter by correspondingly specifying the at least one operating parameter that influences the cutting length or grain cracking.

13. The self-propelled forage harvester of claim 12, wherein the at least one harvesting process parameter comprises compactability, grain cracking, or area output.

14. The self-propelled forage harvester of claim 1, wherein the driver assistance system is configured to receive an updated harvesting process strategy specified by another process participant participating in the harvesting process, the updated harvesting process strategy being different from a current harvest process strategy of the forage harvester.

15. The self-propelled forage harvester of claim 14, wherein the driver assistance system is configured to receive the updated harvesting process strategy from a compaction vehicle associated with a silo, the updated harvest process strategy dependent on a layer height in the silo.

16. The self-propelled forage harvester of claim 15, wherein the updated harvesting process strategy is received from the compaction vehicle responsive to an operator of the compaction vehicle being notified of the layer height in the silo and selecting the updated harvesting process strategy.

17. The self-propelled forage harvester of claim 16, wherein the compaction vehicle includes an interface configured to enable the operator of the compaction vehicle to input the updated harvesting process strategy based on a weighting between at least two harvesting process strategies.

18. The self-propelled forage harvester of claim 16, further comprising a user interface in communication with the driver assistance system; and
    wherein, responsive to receipt of the updated harvesting process strategy, the user interface outputs the updated harvesting process strategy for approval by an operator of the forage harvester.

19. The self-propelled forage harvester of claim 1, wherein the predetermined compactability comprises nearly constant compactability.

\* \* \* \* \*